Figure 1:
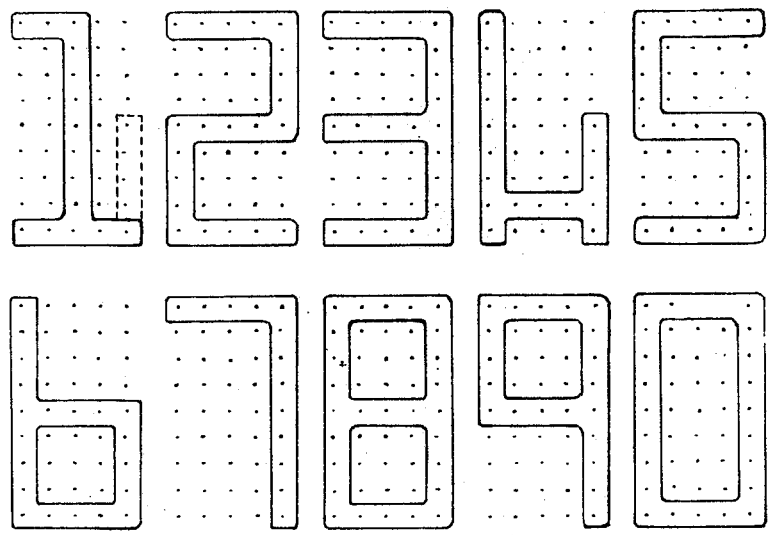

Feb. 17, 1970  R. D. HAXBY ET AL  3,496,541
APPARATUS FOR RECOGNIZING CHARACTERS BY SCANNING
THEM TO DERIVE ELECTRICAL SIGNALS
Original Filed Aug. 24, 1962  13 Sheets-Sheet 1

INVENTOR
Ralph D. Haxby and
George O. Norrie
BY
Kenyon, Palmer, Stewart & Estabrook
ATTORNEY Feb. 17, 1970   R. D. HAXBY ET AL   3,496,541
APPARATUS FOR RECOGNIZING CHARACTERS BY SCANNING
THEM TO DERIVE ELECTRICAL SIGNALS
Original Filed Aug. 24, 1962   13 Sheets-Sheet 2
Fig. 3.
|    | A | B | C | D | E |
|----|---|---|---|---|---|
| 1  | × |   |   |   |   |
| 2  |   | × |   |   |   |
| 3  |   |   | × |   |   |
| 4  |   |   |   | × |   |
| 5  | × |   |   |   | × |
| 6  | × | × |   |   | × |
| 7  | × |   | × |   | × |
| 8  | × |   |   | × | × |
| 9  | × |   |   |   | × |
| 10 |   | × |   |   |   |
| 11 |   |   | × |   |   |
| 12 |   |   |   | × |   |
| 13 |   |   |   |   | × |
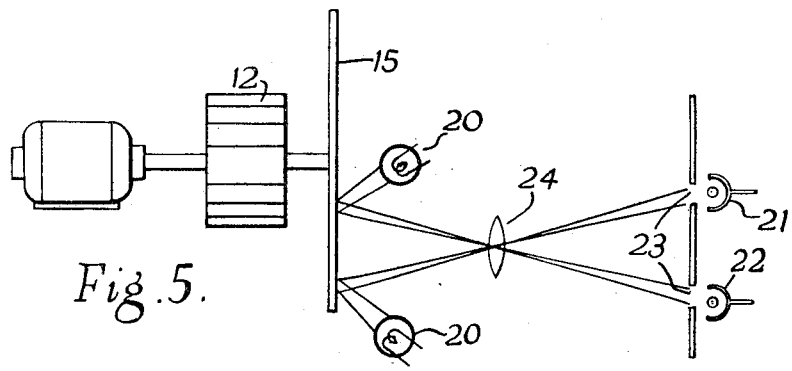
Fig. 5.
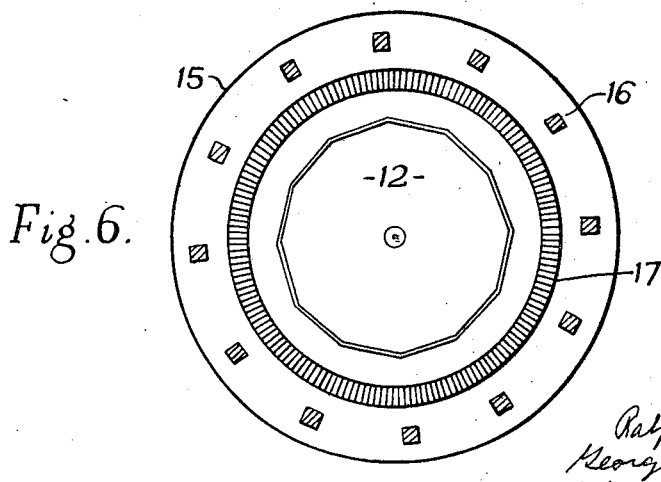
Fig. 6.
INVENTORS
Ralph D. Haxby
George O. Norrie
BY
Kenyon, Palmer, Stewart & Estabrook
ATTORNEY Feb. 17, 1970          R. D. HAXBY ET AL          3,496,541
APPARATUS FOR RECOGNIZING CHARACTERS BY SCANNING
THEM TO DERIVE ELECTRICAL SIGNALS
Original Filed Aug. 24, 1962          13 Sheets-Sheet 3

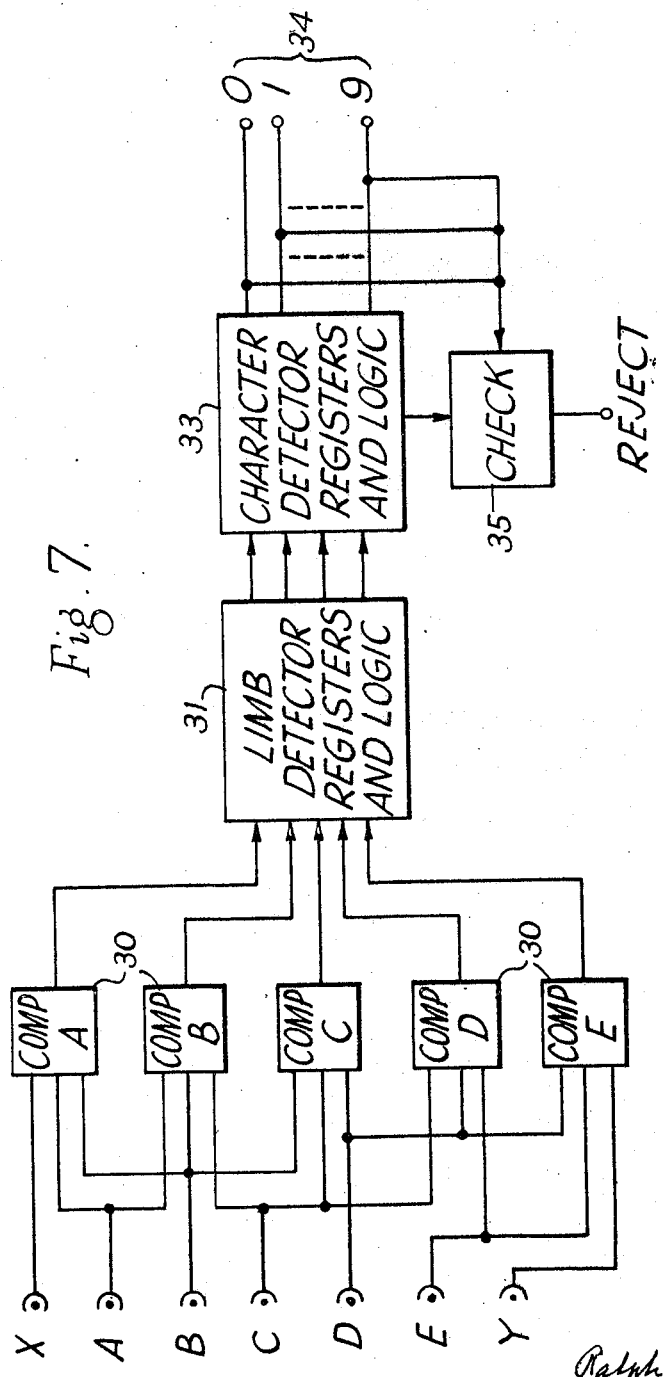

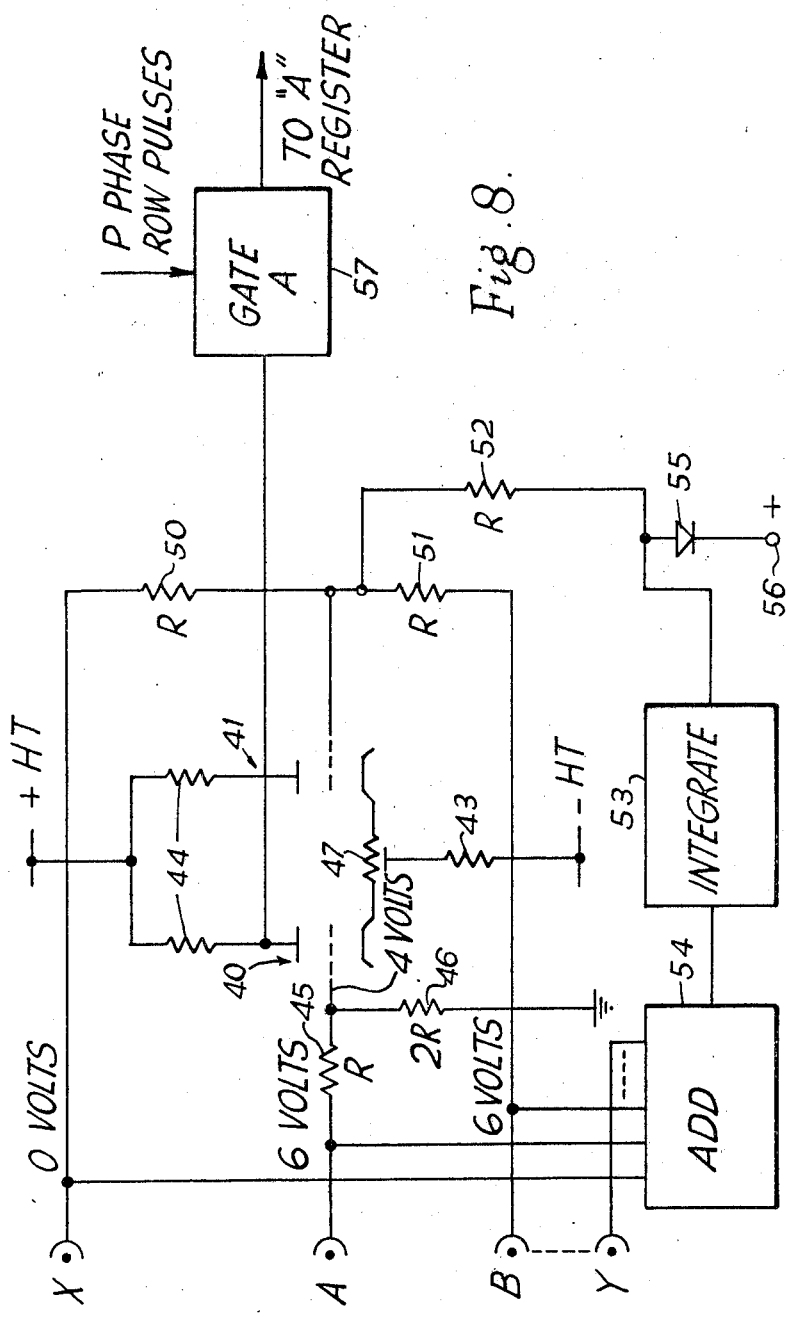

Fig. 11.

| | | I | II | III | IV | V | VI | VII | VIII | IX |
|---|---|---|---|---|---|---|---|---|---|---|
| | | X | VIII | VII | VI | V | IV | III | II | I |
| 1 | H. | | | | | | | | | × |
| | L.V. | | | | | | | | | |
| | R.V. | | | | | | | | | |
| | C.V. | | | × | × | × | × | × | | |
| 2 | H | × | | | | × | | | | × |
| | L.V. | | | | | × | | | | |
| | R.V. | | | | | × | | | | |
| 3 | H. | × | | | | × | | | | × |
| | L.V. | | | | | | | | | |
| | R.V. | | | | | × | × | × | × | × |
| 4 | H | | | | | | | | × | |
| | L.V. | × | × | × | × | × | | | | |
| | R.V. | | | | | | | | | × |
| 5 | H | × | | | | × | | | | × |
| | L.V. | × | | | | | | | | |
| | R.V. | | | | | | | | | × |
| 6 | H. | | | | | × | | | | × |
| | L.V. | × | × | × | × | × | | | | |
| | R.V. | | | | | | | | | × |
| 7 | H. | × | | | | | | | | |
| | L.V. | | | | | | | | | |
| | R.V. | | | | | × | × | × | × | × |
| 8 | H. | × | | | | × | | | | × |
| | L.V. | × | × | × | × | × | | | | |
| | R.V. | | | | | × | × | × | × | × |
| 9 | H | × | | | | × | | | | × |
| | L.V. | × | | | | | | | | |
| | R.V. | | | | | × | × | × | × | × |
| 0 | H. | × | | | | | | | | × |
| | L.V. | × | × | × | × | × | | | | |
| | R.V. | - | | | | × | × | × | × | × |

(a)

(b)

Feb. 17, 1970    R. D. HAXBY ET AL    3,496,541
APPARATUS FOR RECOGNIZING CHARACTERS BY SCANNING
THEM TO DERIVE ELECTRICAL SIGNALS
Original Filed Aug. 24, 1962    13 Sheets-Sheet 12

United States Patent Office 3,496,541
Patented Feb. 17, 1970

3,496,541
APPARATUS FOR RECOGNIZING CHARACTERS BY SCANNING THEM TO DERIVE ELECTRICAL SIGNALS
Ralph D. Haxby, Farnborough, and George O. Norrie, Bromham, England, assignors, by mesne assignments to Farrington Electronics Incorporated, Springfield, Va., a corporation of Massachusetts
Continuation of application Ser. No. 219,203, Aug. 24, 1962. This application Aug. 31, 1965, Ser. No. 487,966
Claims priority, application Great Britain, Aug. 28, 1961, 31,003/61
Int. Cl. G06k 9/00
U.S. Cl. 340—146.3                                18 Claims This application is a continuation of our application No. 219,203, filed Aug. 24, 1962 and now abandoned.

The present invention relates to character recognition apparatus of the type adapted to recognize more or less conventionally represented alphabetic, numerical and other characters by sensing their parts to derive information in the form of two-level electrical signals which are applied to logical circuits determining which of a vocabulary of characters with which the apparatus operates the sensed character is.

It is now widely accepted that some compromise is necessary in the representation of the characters, too much complication and expense being involved in apparatus which can recognise conventional type faces. In spite of the use of specially designed character outlines, serious obstacles to recognition remain because of the deficiences in printing and registration of the characters which occur. This is particularly true in that the most important field of application of automatic character recognition at present is to such documents as cash register tally rolls and other automatically-printed documents showing monetary or other quantities which have to be totaled, analyzed and so on. These documents are usually on poor quality paper and are badly printed because printing is effected by print wheels and an inked ribbon.

Typical defects are:

(a) Character not in registration.
(b) Breaks in limbs.
(c) Spurious marks printed alongside the character.
(d) The weave of the inked ribbon shows up as detail in the character proper and spurious marks.
(e) Variable background density.

Of these defects the last is one of the most serious because it is difficult to determine which of the parts of the observed field should be adjudicated black and which white. A partial solution to this problem was described in the specification of application No. 154,656 now abandoned where it was proposel initially to determine the average contrast over the observed field and to adjust a clipping level appropriately, this level constituting the dividing line in signal level between black and white.

This provision has been found not always to be completely sufficient because densities may vary too widely over the observed field for an average to have much meaning. The top of a character may be printed very heavily but be surrounded by quite dense smudges in consequence, while the bottom half is more lightly printed on a cleaner background. While over the whole observed field *local contrast* is sufficient to show what should be called black (that is a part of the true character) and what white, a clipping level set up on the basis of an average may well lead to some of the denser smudges being adjudicated black and perhaps some of the weaker parts of the bottom of the character being adjudicated white.

It, therefore, appears to be desirable to adjudicate between black and white on the basis of *local contrast*. This has already been proposed in broad terms. Specifically it has been proposed to adopt a scanning procedure and treat the scanning field as divided into a plurality of scanning areas. In scanning any one area two or more adjacent areas are scanned successively so that differences in brightness between the one area and the adjacent areas can be evaluated as the identification criteria. The differences in brightness are detected as jumps in the course of the successive scanning, detection being effected by using an amplifier with high pass filter characteristics for example.

In its broadest aspect the present invention is concerned with a different application of the same general principle of adjudicating on the basis of local contrast which, as will be shown hereafter yields a powerful tool for detecting the limbs of characters.

In its broadest aspect the invention provides character recognition apparatus of the type hereinbefore specified wherein a plurality of elementary area or cells over the observed field are adjudicated black or white (thereby adjudicating the luminance value of the cell) by comparing the density of the area with a predetermined function of the density of the immediate locality of the area.

The information thus derived can be treated as in earlier reading machines, for example that described in the specification of our U.K. Patent No. 850,582.

Strictly speaking the term density as used herein is to be understood in terms of the particular means used to sense the parts of the symbol. If, as is most commonly the case, light reflected from an aperture scanning the symbol is sensed, density corresponds to the inverse of reflectance. It should also be understood that black and white are used as convenient terms without implying that black characters on a white ground only can be sensed. The actual colour of the print is not a matter of importance to this invention.

The character can be scanned by a small retangle defining the elementary areas and a larger rectangle defining the localities of the areas. Instead of rectangular apertures, small and larger circles may be employed. The outputs of photocells seeing the two apertures suitably weighted to take account of the different sizes of the apertures can be applied to a comparator circuit such as that subsequently described.

The invention further provides character recognition apparatus of the type hereinbefore specified, wherein the observed field is treated as if divided into a succession of parallel rows of elementary areas for each of which the optical density is determined photo-electrically, each area (other than the extreme areas in each row) being adjudicated black or white according as to whether its density is greater than or less than a predetermined function of the densities of elementary areas to either side thereof in the same row, the presence of character limbs being determined on the basis of specific sequences of black and white areas in successive rows and the nature of the character being determined on the basis of the particular combination of limbs detected.

Alternatively each area can be compared with adjacent areas not only in its own row but in adjacent rows.

The preferred way of obtaining the information regarding the elementary areas is to use a set of photo-electric devices which correspond to the areas respectively in a row and to obtain relative displacement between the row of apertures of the devices and the observed field in a direction transverse to (but not necessarily perpendicular to) the row of devices. This is because all the information necessary for adjudicating the areas in a row is available simultaneously and storage is not necessary at this stage. Storage is undesirable prior to adjudication where bilevel signals have not been arrived at because of the cost of the components necessary to supply sufficient storage. If a procedure, a scanning procedure with one photo-electric device only for example, is adopted whereby storage must be effected before adjudication, the density for each elementary area must be stored. A suitable way to do this would be by means of a 4-level binary code giving a density scale graded in 16 steps. This would not perhaps involve too much equipment if it were only necessary to store for one row at a time, as would be the case if scanning was effected along each of the rows in turn. The use of one photo-electric device per area in a row is however preferred.

Example of bases for adjudication are best shown by indicating the densities of the areas of a row by the symbols $A(l)$ to $A(n)$ the density of a general area $r$ being $A(r)$ and by giving the condition for an area $r$ to the adjudicated black. The simplest condition is:

$$A(r) > \tfrac{1}{2}[A(r-1) + A(r+1)]$$

Another is $$A(r) > pA(r-2) + qA(r-1) + rA(r+1) + sA(r+2)$$

where $p+q+r+s=1$, and for example $p=q=r=s=\tfrac{1}{4}$.

Sometimes it may be desirable to sense the two halves of an area separately and use conditions such as:

$A(r)$ is black if $$A_1(r) \text{ or } A_2(r) > \tfrac{1}{4}[A_1(r-1) + A_2(r-1) + A_1(r+1) + A_2(r+1)]$$

or $A(r)$ is black if $$A_1(r) + A_2(r) > A_2(r-1) + A_1(r+1)$$

where suffices 1 and 2 indicate the two halves of an elementary area.

Different possibilities can be selected to deal with different situations as they occur in practice. Whatever the condition adopted, it is most conveniently realised by means of a differential amplifier fed on either side with the appropriate functions.

The power of the principle of the invention discussed above lies in the ease with which limbs crossing the rows of elementary areas are detected, whatever the variation in density along the limb. Thus a limb parallel to the aforementioned direction of movement yields the result $A(r)$ is black in a succession of rows. A limb which is not parallel to the said direction yields successions of blacks such as $$A(r), A(r+1), A(r+2), A(r+3) \ldots$$

to take the simplest case, or say $$A(r), A(r) \text{ and } A(r+1), A(r+1), A(r+1)$$
$$\text{and } A(r+2), A(r+2)$$

Curved limbs yield more complicated successions but they can be recognised by appropriate logic. The logic necessary is basically "and" logic with as much "or" logic as is necessary to allow for breaks in limbs.

It is at this point that a particularly advantageous development of the invention can be considered. This is concerned with characters whose definitive limbs are horizontal and vertical limbs. To recognise these the rows of elementary areas can be arranged obliquely, preferably at 45° to the vertical and horizontal, with corresponding areas in successive rows falling into columns which are parallel to either the horizontal or vertical limbs. Both types of limbs are then recognised simply with very little storage, one type as blacks in the same area in successive rows and the other type as blacks in successive areas in successive rows.

The combination of limbs detected needs to be stored and a second stage of logic is then applied to detect characters. Again "and" logic is basic, "or" logic may be necessary and "not" logic can be used to differentiate say a "2" and "8" in the specific representation subsequently discussed since the "2" is contained in the "8." "Not" logic is not necessary as there exists the alternative approach of inhibiting the recognition of "2" when "8" is recognised and so on.

From the foregoing it will be appreciated that the following stages are essential to apparatus embodying the invention:

(1) Sensing to determine densities (e.g. reflectances) of areas.
(2) Comparison to adjudicate areas black or white.
(3) Storage of bi-level signals indicating black and white areas.
(4) Detection of limbs by logic applied to (3).
(5) Storage of detected limb combinations.
(6) Detection of characters by logic applied to (5).

It is advantageous for the storage in both stages (3) and (5) to be dynamic, using shift registers through which the patterns of "1's" and "0's" pass. (In stage (3) it will be assumed "1" is black and "0" is white. In stage (5) it will be assumed "1" is limb present and "0" is limb absent. What limb is present will be indicated by the part of the store holding the "1.")

The point of using dynamic storage is that registration problems are reduced. As the patterns of "1's" shift through the stores, the point is reached where meaningful input combinations are applied to the logical circuits and detection takes place. The only difficulty is that, because "or" logic is essential, there is a risk of giving a meaningful interpretation to bits of two adjacent characters for example. This sort of difficulty is always present in character recognition apparatus because it is necessary to deal with imperfect symbols and in the mean each specific case must be taken on its merits at the design and prototype stage and such modifications to the logic and so on be made as experience shows to be requisite.

Figure 2:
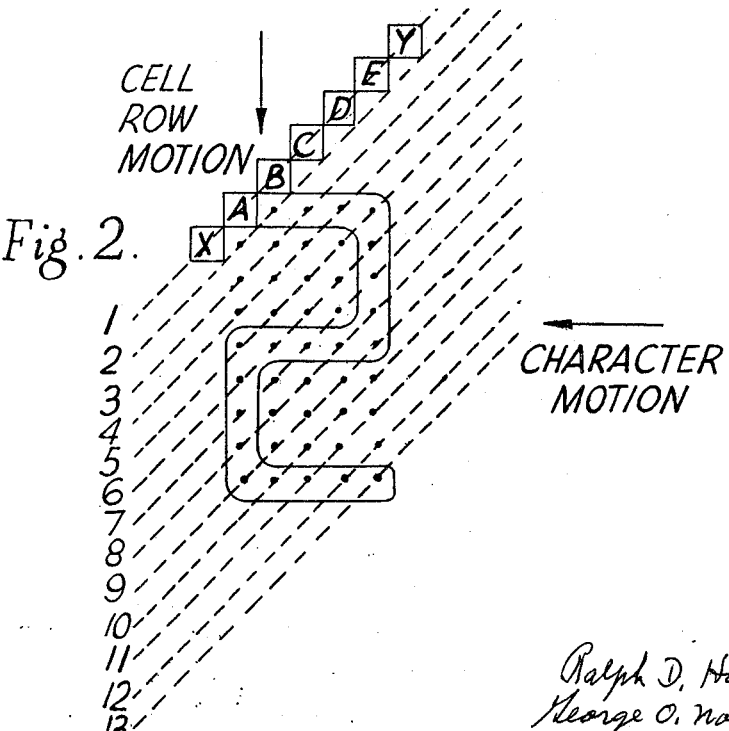
Figure 4:
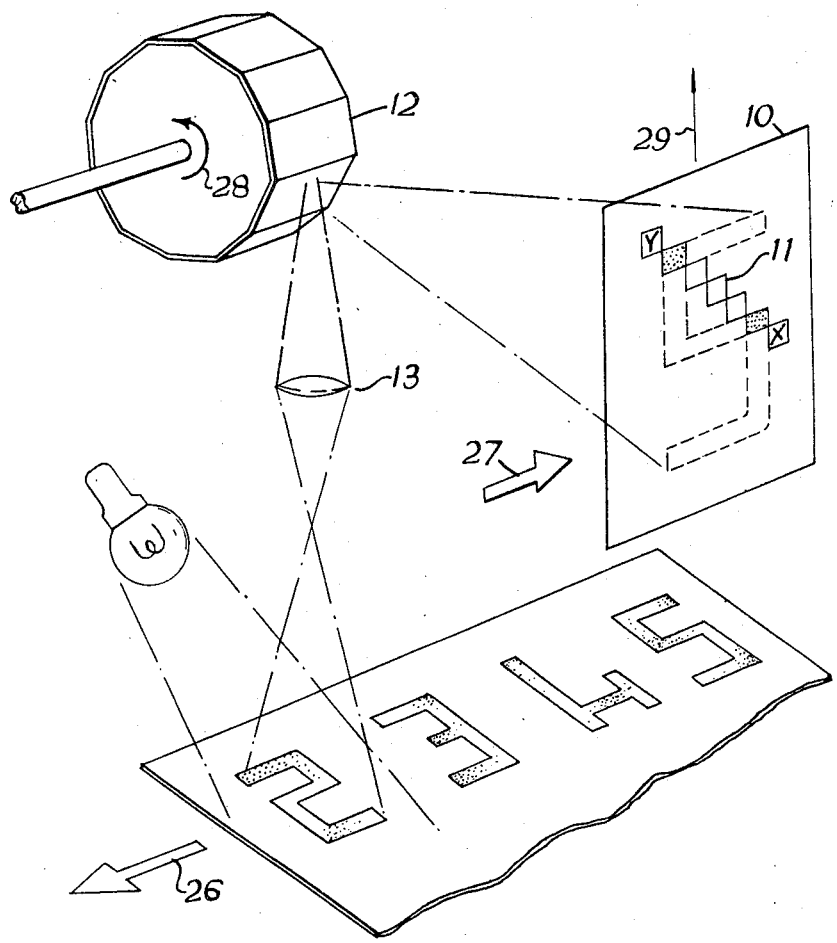
Figure 9:
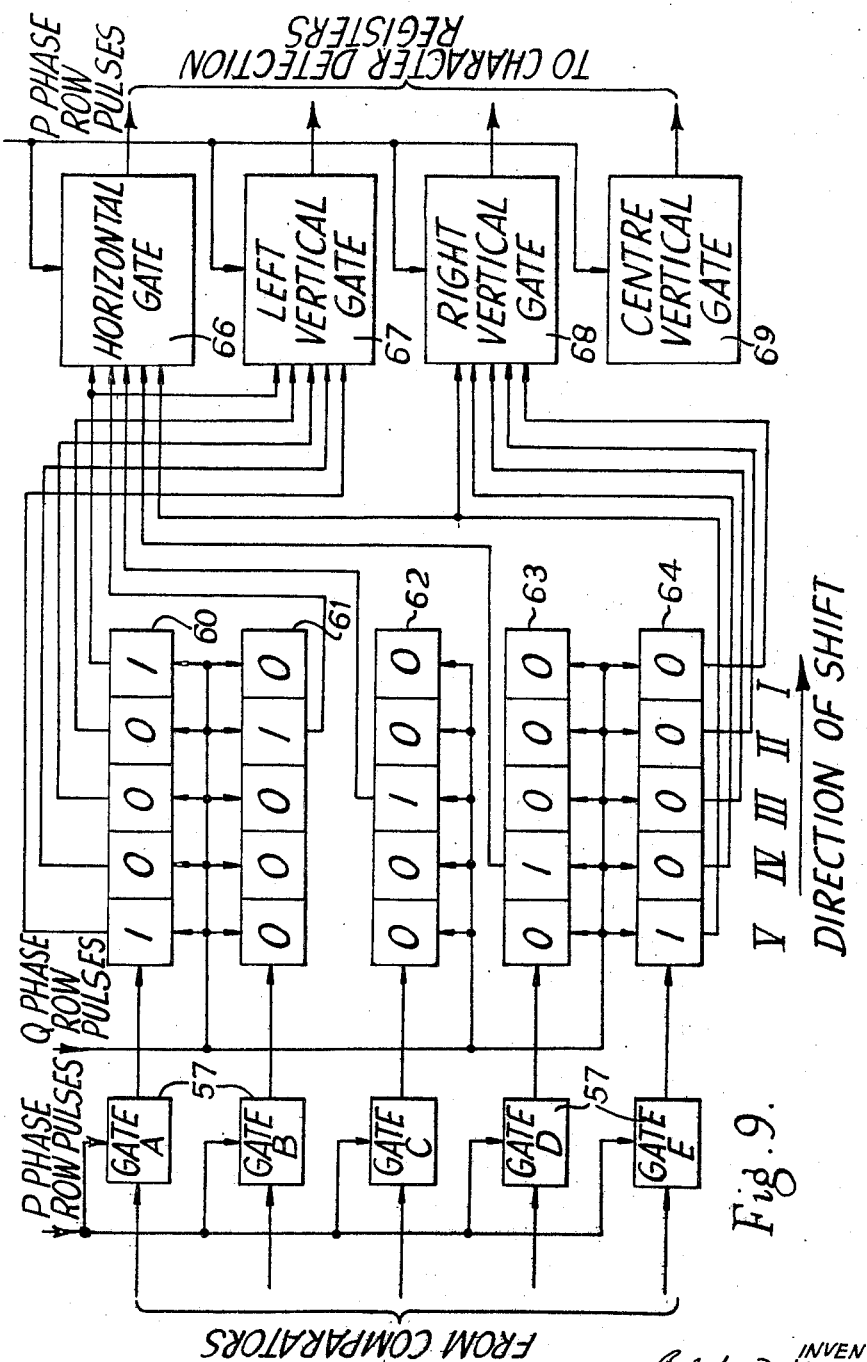
Figure 10:
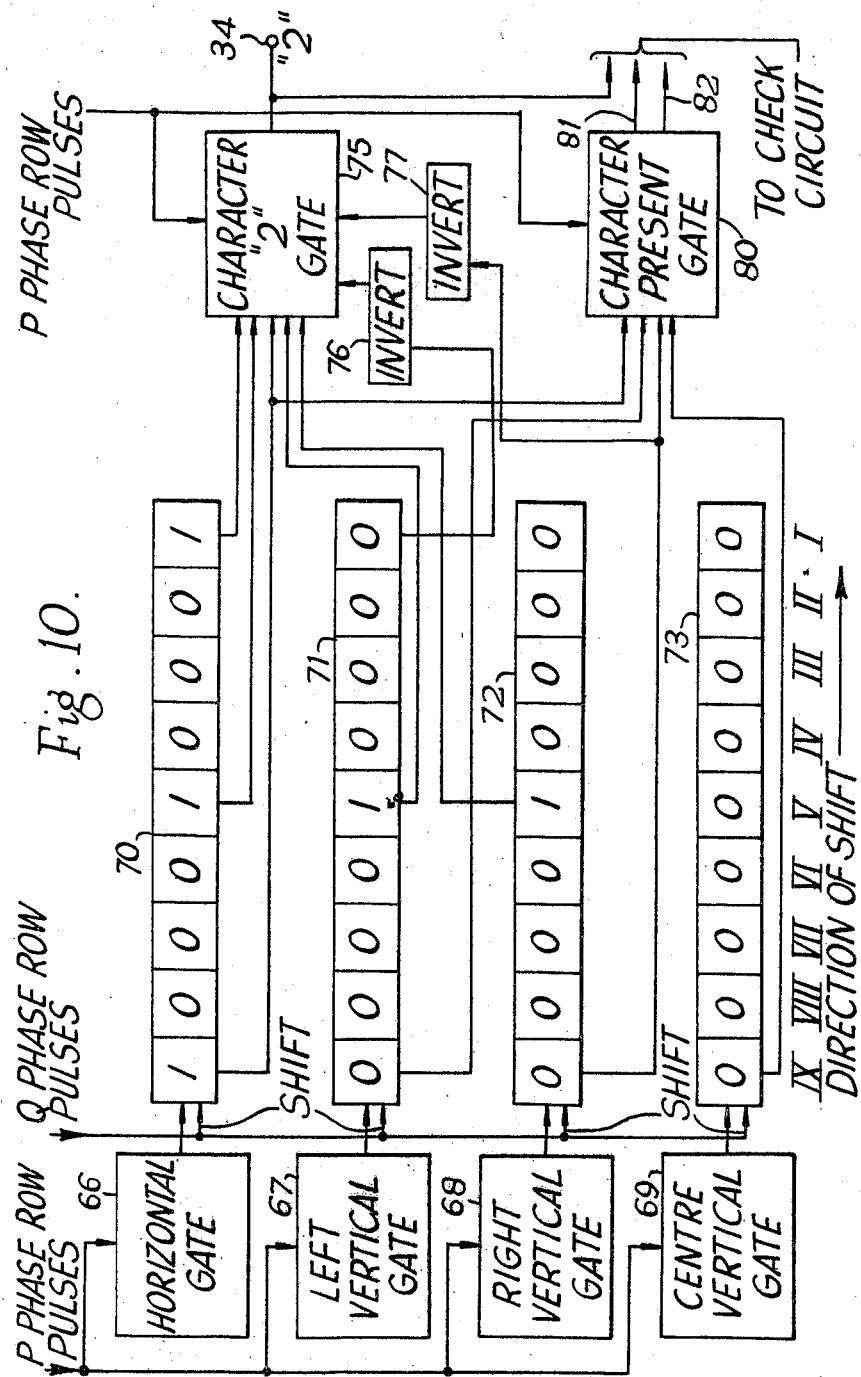
Figure 12:
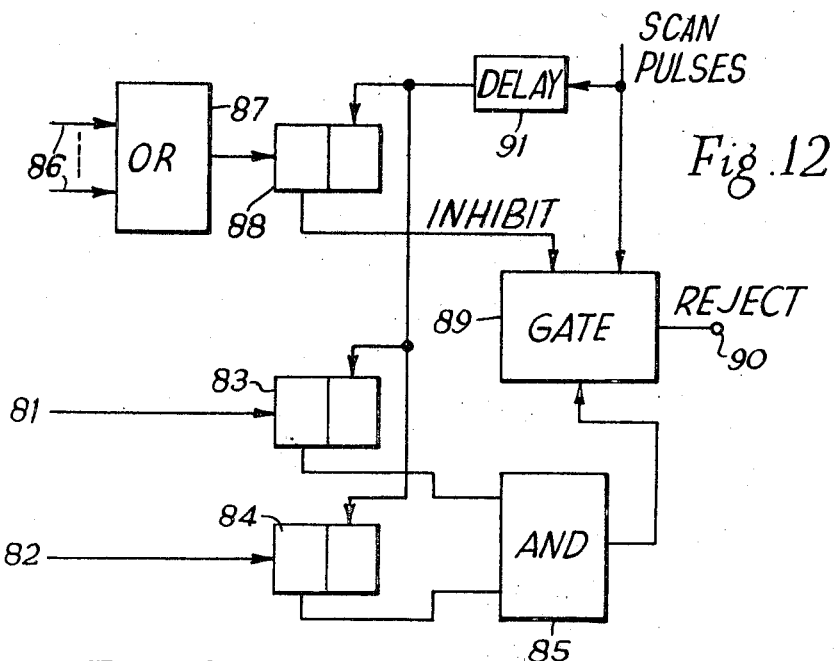
Figure 13:
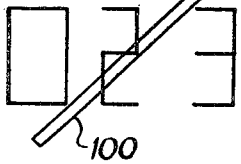
Figure 14:
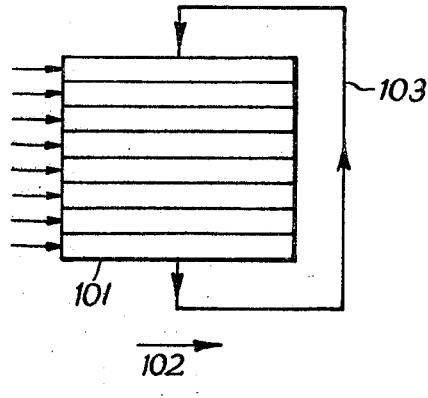
Figure 15:
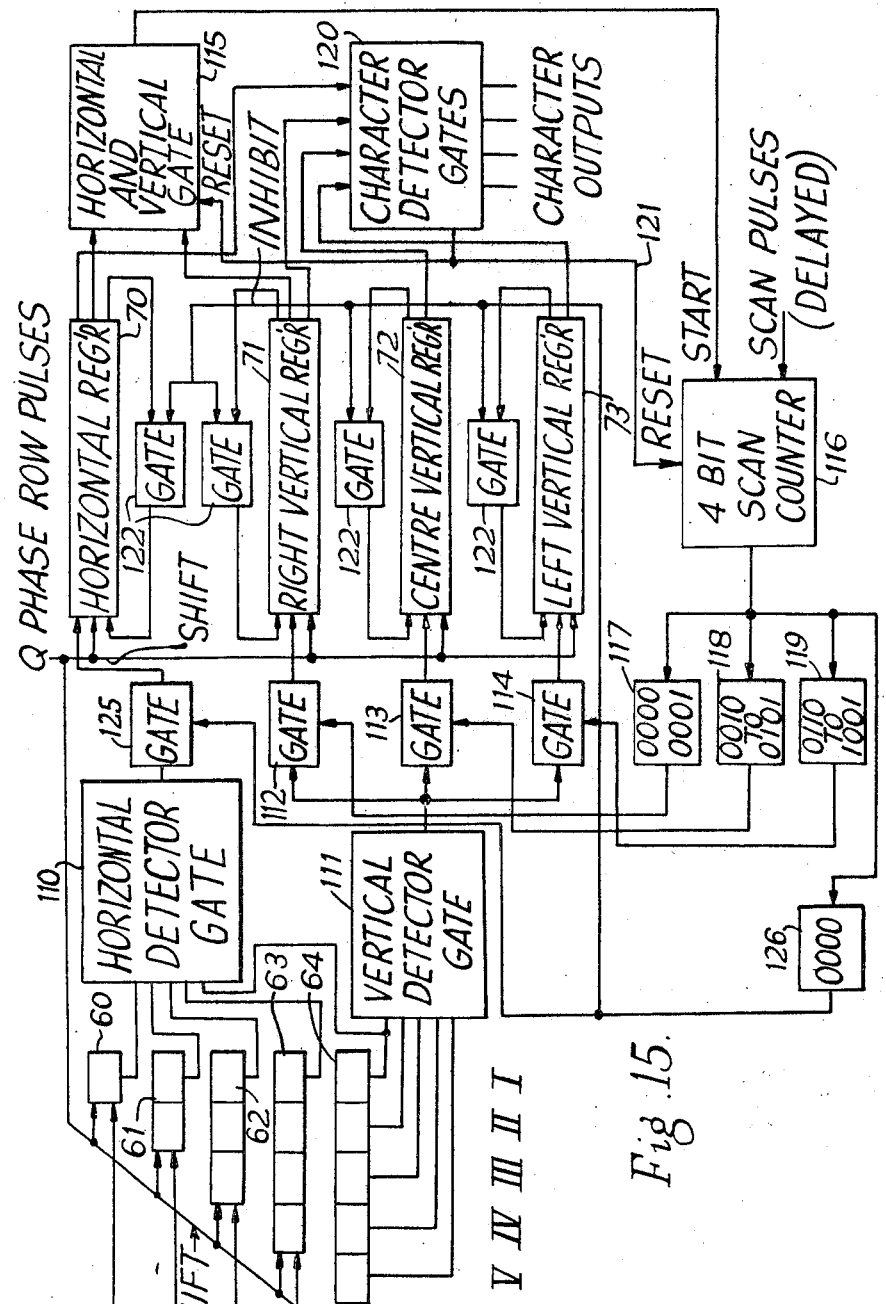
Figure 16:
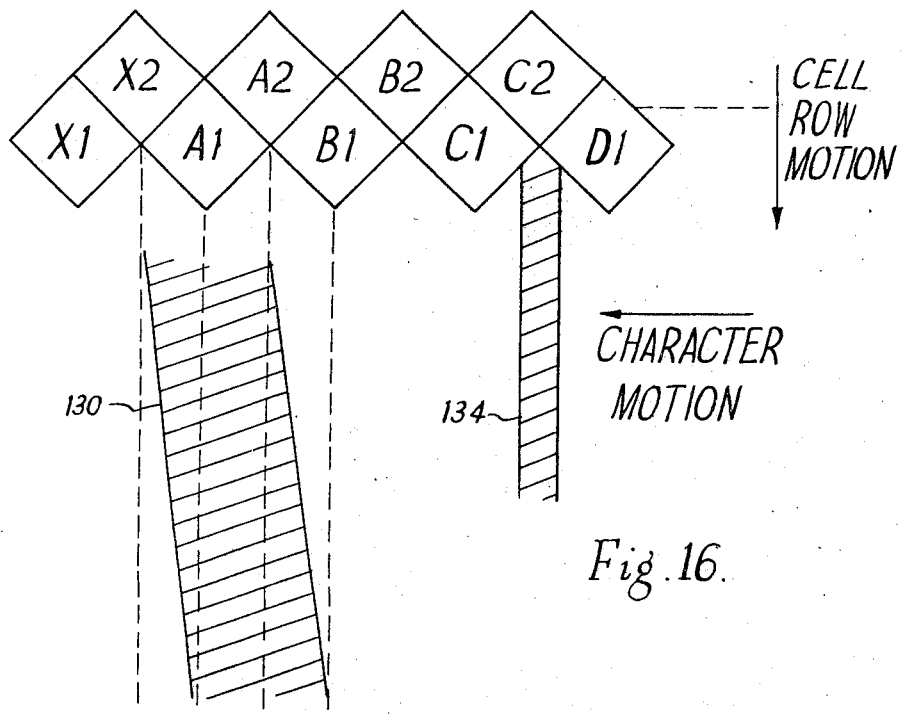
Figure 17:
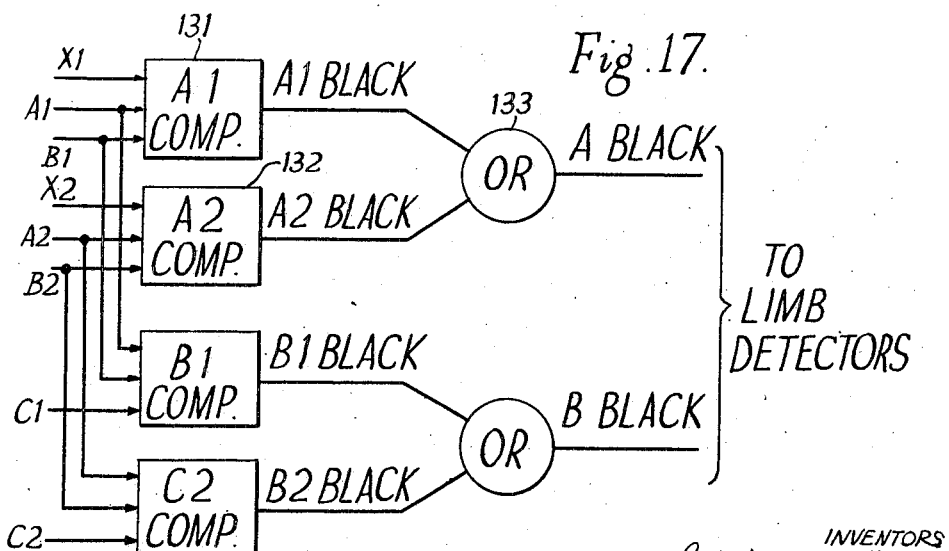
Figure 18:
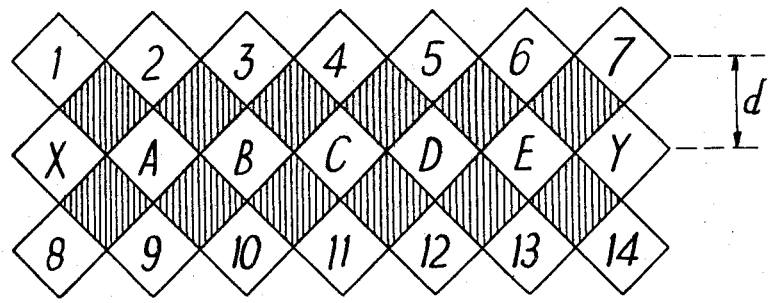
Figure 20:
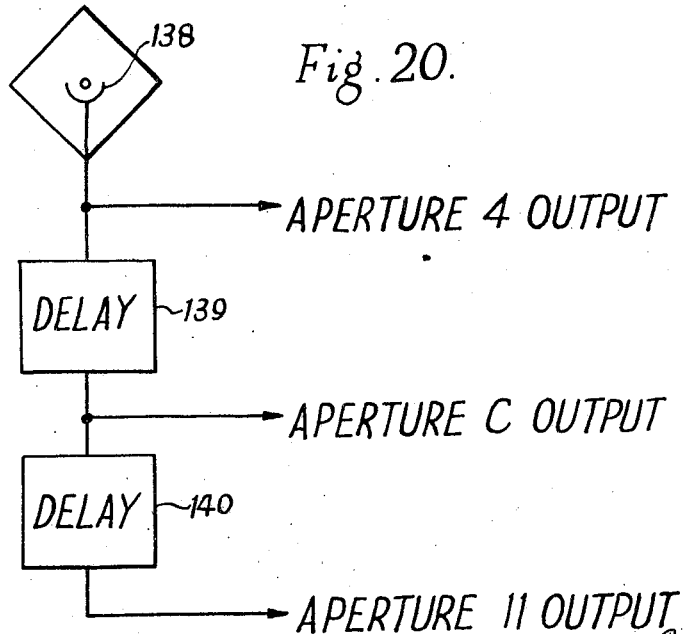
Figure 19:
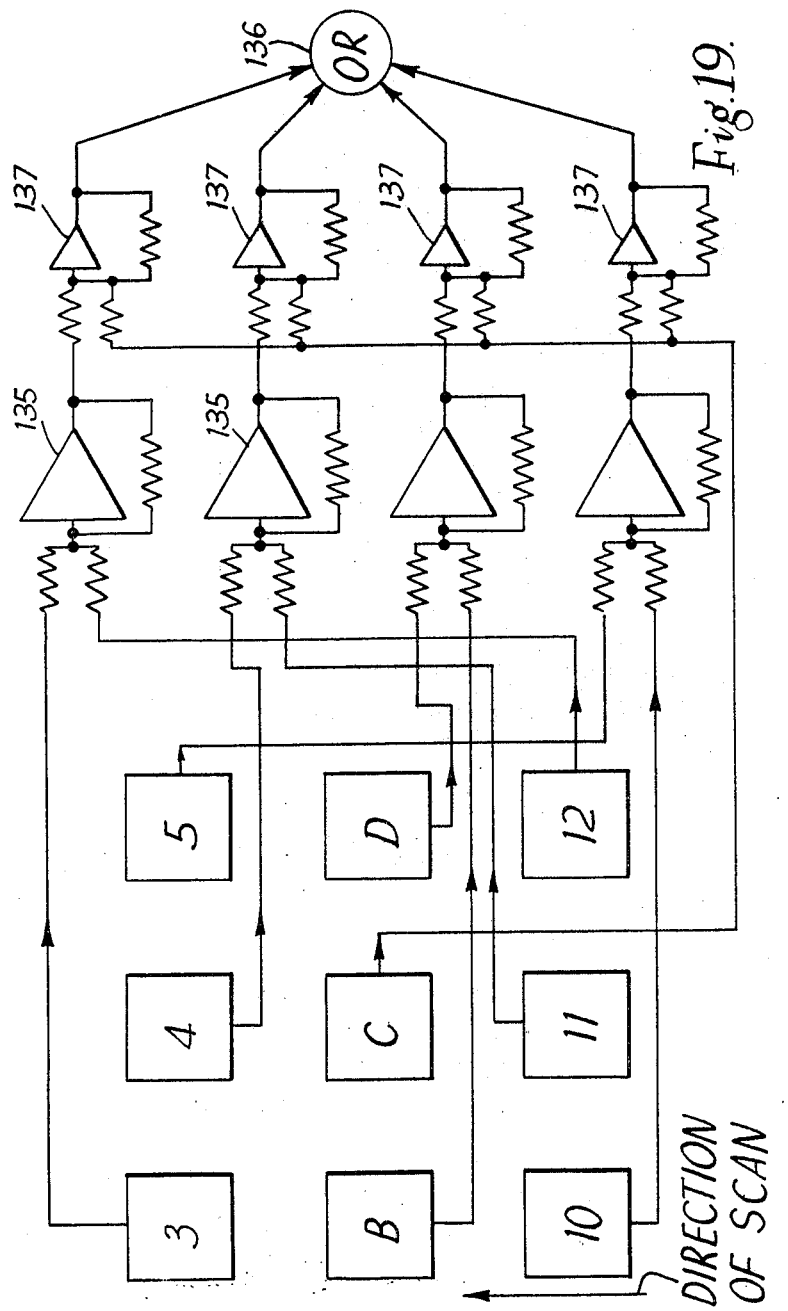

The registration aspect is considered further in the ensuing description of one embodiment of the invention and of certain modifications thereto, given by way of example with reference to the accompanying drawings, in which:

FIG. 1 shows characters 0 to 9 in a form suited to recognition by the apparatus shown in subsequent figures, FIG. 2 is an enlarged diagram of the character "2" used in explaining the principle of operation of the apparatus, FIG. 3 is a table derived from FIG. 2, FIG. 4 illustrated the optical arrangements of the apparatus, FIGS. 5 and 6 show details of the arrangement used to obtain timing pulses for controlling the apparatus, FIG. 7 is an overall block diagram of the apparatus, FIG. 8 is a more detailed diagram of one comparator for adjudicating between black or white, FIG. 9 is a block diagram of a first dynamic storage and limb detection stage, FIG. 10 is a block diagram of a second dynamic storage and character stage, FIG. 11 illustrates in tabular form the contents for the different numerals of the second dynamic store, FIG. 12 is a block diagram of a check circuit, FIGS. 13 and 14 are explanatory diagrams concerned with one possible modification of the apparatus shown in the preceding figures, FIG. 15 is a block circuit diagram of another embodiment of the invention, FIG. 16 illustrates an arrangement for detecting skewed limbs, FIG. 17 shows circuits for use in the arrangement of FIG. 16, FIG. 18 shows how three rows of apertures may be scanned across the character, instead of one row, FIG. 19 shows circuits for use with three rows of apertures, and FIG. 20 shows a variant thereof.

The characters 0 to 9 in FIG. 1 have been designed on a rectangular 5 x 9 array of squares the centres of which are indicated by dots in each instance. Obviously the basis can be other than a 5 x 9 array and, in particular, an array giving greater resolution may be desired. Each character is composed of horizontal limbs, left verticals, right verticals and in the case of "1" a centre vertical. As will appear hereinafter the way in which final storage is effected enables account to be taken of whether the horizontals are top, centre or bottom and verticals are divided into short top and bottom verticals. In some cases, one example of which is discussed at the end of this specification, it may be desirable for every character to have a right vertical. If this is so, the "1" can be modified as shown in broken lines.

The characters shown are acceptable for applications such as cash register tally rolls and other commercial documents, though with some increased complication the form of "4" and if desired "7" could be made closer to the conventional.

The character "2" is shown to an enlarged scale in FIG. 2 together with the fields of view of the photocells X, A, B, C, D, E, Y making up a diagonal row of cells. This row of cells is effectively scanned vertically down over the symbol at a rapid rate and senses a row of elementary areas at each of thirteen row positions indicated by broken lines 1 to 13. The character is moved continuously from right to left at a much slower rate than the scanning rate so that the character motion can be ignored in any one complete scan. The importance of the character motion is that in the course of successive scans, the character will reach a position of correct horizontal registration in which the five columns of the 5 x 9 array on which the character is based line up with cells A to E, as shown.

The pattern of black areas which are then detected in one vertical scan is shown in FIG. 3 where a cross represents a black area. This pattern of course gives a skewed representation of the "2" as observed. It is not necessary to store the whole pattern of FIG. 3. If the pattern is stored over five rows only, when the first five rows have been shifted into the store the upper horizontal is recognised as black in AI, BII, CIII, DIV and EV. Roman numerals are here used to designate the positions of the store as used in FIG. 9. The arabic numerals in FIG. 3 are row numbers, corresponding with FIG. 2. As the rows continue to shift through the store nothing significant happens until rows 5 to 9 are in position I to V when the right and left verticals are recognised as black in EI to EV and black in AI to AV respectively whilst the centre horizontal is indicated again by AI, BII, CIII, DIV and EV. Subsequently when rows 9 to 13 are in position I to V the lower horizontal is recognised.

The succession of limbs:

(a) Horizontal.
(b) Left and right verticals and horizontal.
(c) Horizontal.

is characteristic of "2" and enables it to be recognised.

FIG. 4 shows how what is called cell row motion in FIG. 2 is actually achieved by moving an image of the character over a screen 10 with apertures 11 behind which the photocells themselves are arranged. (In FIG. 4) as drawn the cells would, of course, be on the readers side of screen 10.) The image of the character is focussed by means of a rapidly revolving mirror drum 12 and a collimating system 13 on to the screen 10. In FIG. 4, arrow 26 shows the actual direction of motion of the document with resultant motion of the image on the screen 10 in direction of arrow 27. Arrow 28 shows the direction of rotation of the drum 12 with resultant motion of the image on the screen 10 in the direction of arrow 29.

The shaft of the mirror drum also bears an annular grating 15 (FIGS. 5 and 6) which provides timing pulses for the whole system. An outer ring of areas 16, one for each drum facet, mark off the successive vertical scans. An inner ring of markings 17 mark off the rows such as are shown at 1 to 13 in FIG. 2. There are actually, of course, considerably more than 13 rows in each vertical scan and, as nothing is known about the vertical registration of the symbol the rows cannot really be numbered in the way of FIG. 2. In practice, thirteen rows in effect number themselves 1 to 13 when they yield the meaningful information discussed in connection with FIGS. 2 and 3.

The gratings are illuminated by lights 20 and photo cells 21 to 22 receive reflected light through slits 23 by way of a collimating system 24. The pulses generated by cells 21 and 22 are of course shaped before use but such details form no part of the present invention, are common practice and are not therefore considered. The timing pulses provided by areas 16 and cell 21 will be called scan pulses. The timing pulses provided by areas 17 and cell 22 will be called row pulses. In the case of the row pulses at least, what may be called P and Q phases must be available to avoid operation of gates when registers are shifted. The standard technique of alternating shifts with operations of gates is thus used.

The application of these timing pulses is not illustrated in the block diagram, FIG. 7 which will now be considered. This omission is made for clarity and the timing connections are shown in the more detailed, subsequent drawings.

In FIG. 7 the seven cells X, A to Y are shown feeding 5 comparator circuits 30 for the channels A to E respectively and each of which produces a characteristic output when the output from the corresponding cell is adjudicated black. The outputs from the comparator circuits are gated into corresponding shift registers which are connected to logic for detecting limbs. These registers and logic are shown as one block 31 in FIG. 7 and are shown in more detail in FIG. 9.

The limb detector registers and logic 31 are followed by very similar character detector registers and logic 33 with output terminals 34 for the characters 0 to 9. These terminals are connected to a check circuit 35 which indicates when non-recognition of a character is merely because there is a blank space and when reject is to be signalled.

FIG. 8 shows the comparator 30 for channel A, also showing an optional feature not brought into the block diagram of FIG. 7. The comparator comprises a long-tailed pair differential amplifier with triodes 40 and 41 having a common cathode load 43. The anode loads 44 and other circuit parameters are so chosen that a marked swing in anode potential results from very little change in the differential output. The output which is taken from the anode of triode 40 can, therefore, be regarded as a two-level, black or white signal.

The input to the grid of triode 40 is from the junction of two resistors 45 and 46 of values R and 2R connected in series between cell A and earth. The potential on the grid of triode 40 is, therefore, $\frac{2}{3}V_A$ where $V_A$ is the output of cell A. (The output will, of course, be amplified in practice but this detail is not illustrated.) As shown it is assumed that cell A is viewing dead black and yields a maximum signal of 6 volts. The potential on the grid of triode 40 is, therefore, 4 volts.

The input to the grid of triode 41 is provided by a three input adding network consisting of resistors 50, 51 and 52, all of equal value R. Resistors 50 and 51 are connected to cells X and B respectively assumed in this example to be viewing dead white and dead black and thus giving signals of 0 volts and 6 volts respectively. Resistor 52 is connected to the output of an integrator 53 which provides a measure of the mean density over at least a part of the character field by the simple procedure of adding the outputs of all cells X, A to Y in circuit 54 and integrating in circuit 53. The output from circuit 53 can be designated $V_I$. $V_I$ never exceeds 6 volts and is never allowed to fall right down to zero by a diode 55 connected to a slightly positive terminal 56.

The potential on the grid of triode 14 is, therefore, $\frac{1}{3}(V_x + V_B + V_I)$ and $V_A$ is adjudicated black if $$\tfrac{2}{3}V_A > \tfrac{1}{3}(V_x + (V_B + V_I))$$

Of course the circuit can readily be arranged to perform the simple comparison to determine $V_A > (V_x + V_B)$. The actual comparison suggested amounts to superimposing on the local contrast criterion basic to the present invention, the overall contrast adjustment considered in the specification of U.S. application No. 154,656 now abandoned. Thus if the character field as a whole is dense, $V_I$ will be relatively high and $V_A$ must be that much higher to be adjudicated black. If in the example given $V_I$ is 3 volts the potential on the grid of triode 41 will be 3 volts. Two-thirds $V_A$ is 4 volts and so $V_A$ will accordingly be found black and the potential on the anode of triode 40 will be at the low level indicating this. The purpose of diode 55 is to ensure that the potential on the grid of triode 41 is always slightly positive, rendering it impossible for the output of cell A to be adjudicated black when the cell is merely seeing an off-white background.

Resistor 47 is for balancing the differential amplifier under no input signal conditions. In practice the circuit shown will have other circuit refinements which are not shown as they lie in the province of conventional circuit design.

The output on the anode of triode 40 is gated in gate 57 by the P-phase row pulses to provide an input to the circuit 31. This circuit is shown in more detail in FIG. 9 and comprises shift registers 60 to 64 for the channels A to E respectively. Each register has five positions indicated in conformity with the preceding description by roman numerals I to V. At the start of a scan, all positions of all registers are in the "0" state. Thereafter, for each register, each P phase row pulse causes position V to be set to the "0" or "1" state according to whether the output of the corresponding gate 57 is white or black, whilst the content of position V is shifted into position IV and so on.

As the clear paper below the character is scanned "0's" are shifted into all positions of all registers, thus clearing the store for the start of the next scan. Should the paper not be clear, the inverse of the scan pulse can be used to clear the store during the interval in which the drum 12 changes from one facet to the next.

Assuming that the symbol "2" is being scanned as shown in FIG. 2, the time will come when the contents of the register 60 to 64 correspond to the first five rows of FIG. 3 and this is in fact the situation chosen for illustration in FIG. 9. This situation required the recognition of a horizontal limb which is achieved by a horizontal gate 66 with inputs connected to levels I, II, III, IV and V of registers 60, 61, 62, 63 and 64 respectively. Similarly connections from all positions of register 60 are shown to a gate 67 which detects left verticals and connections from all positions of register 64 are shown to a gate 68 which detects right verticals. Connections from all positions of register 62 to a gate 69 which detects centre verticals are omitted for clarity.

For perfect characters each of the gates 66 to 69 would require energisation of all five of its inputs to produce an output. To deal with defective characters "or" logic must be introduced by for example making a gate produce an output when any 4 out of its 5 inputs is energised, when any consecutive 3 out of its 5 inputs is energised and so on. The way of building up gates (diode gates for example) to perform these logical functions is well understood in the art.

The inputs to gates 66 to 69 are further gated with the P phase row pulses so that the registers 60 to 64 are in effect sampled after each shift in response to a Q phase row pulse.

The circuit of FIG. 10 which shows the details of block 33 in FIG. 7 is in all essential respects of the same nature as the circuit in FIG. 9. Four 9-position shift registers 70 to 73 are fed by gates 66 to 69 respectively and are shown in the state at which the character "2" is recognised. How this state is arrived at will be considered briefly.

When a Q phase row pulse brings the registers 60 to 64 to the state shown in FIG. 9, the next P phase pulse will result in a "1" being entered in position IX of register 70 from gate 66. Four Q phases later, the registers 60 to 61 will assume the state corresponding to rows 5 to 9 in FIG. 3 and, when the ensuing P phase pulse appears gates 66, 67 and 68 will produce an output, entering "1's" in positions IX of registers 70, 71 and 72. Meanwhile the "1" originally entered has been shifted to position V of register 70. Subsequently this "1" is shifted to position I, the three "1's" entered simultaneously are shifted to position V and another "1" resulting from rows 9 to 13 of FIG. 3 is entered in position IX of register 70.

The character "2" is, therefore, recognised by a seven-input gate 75, five inputs of which are coupled to positions I, V and IX of register 70 and position V of register 71 and register 72. Position I of register 71 and position IX of register 72 are coupled through inverters 76 and 77 to the other inputs of gate 75 to introduce "not" logic preventing recognition of a "2" when "8" is sensed. It must be emphasised that the logic of gate 75 will in practice be made sufficiently flexible to deal with imperfect symbols as the occasion requires.

The gates for the other characters are not shown. The connections necessary will be immediately apparent from FIG. 11 which shows in tabular form the states of positions I to IX of registers 70 (H. for horizontal) 71 (L.V. for left vertical), 72 (R.V. for right vertical) and 73 (C.V. for centre vertical), for each of the characters 0 to 9 when the information regarding their limbs has been fully entered into the registers and recognition is to take place.

It will be noted that long verticals produce entries in five consecutive positions of a register. The extreme entries can be regarded as detecting short upper and short lower verticals and the intervening entries may be ignored. It will also be apparent from FIG. 11 how the different horizontals (upper, centre, lower) are distinguished by the positions their entries occupy.

To return to FIG. 10 there is further included a gate 80 used to sense whether a character is present or not. This gate is connected to position IX of each of the registers 70 to 73 and has two output lines 81 and 82 in which signals appear indicating, in the case of line 81 that a horizontal has been detected and in the case of line 82 that a vertical (no matter of what kind) has been detected.

The appearance during one scan of signals in both these lines (not necessarily simultaneously) is taken to indicate that something meaningful which should be recognised as a character is present. To this end the signals set respective bistables 83 and 84 in a check circuit (FIG. 12) and the bistables are connected to an "and" gate 85, an output from which means that a character is in all probability present.

Connections 86 from the terminals 34 are applied through an "or" gate 87 to a bistable 88 and when this is set its output indicates that a character has been recognised. This output is applied to a further gate 89 so as to inhibit the gate when a character has been recognised. The output of the gate 85 and the scan pulses from cell 21 are also applied to gate 89, the function of which is to produce an output pulse when there is a scan pulse coincident with an output from gate 85, so long as no inhibition is applied from bistable 88. Such an output means a character which should have been recognised has, in fact, not been recognised and appears at a terminal 90 to signal "reject." The motion of the document can then be automatically halted to enable the operator to take appropriate action. The bistables 88, 83 and 84 must not be reset until reject has been signalled. They are therefore reset by the scan pulses delayed in a delay line 91.

If the line spacing on the document is small enough for there to be a risk that the circuit of FIG. 12 will indicate "character present" when what is actually sensed in the bottom of a character in one line, the top of a character in the line below, the logic can be developed to exclude such a possibility.

If perfect characters were being dealt with, this apparatus would involve no difficulties whatsoever with registration. No recognition would take place at all except in that scan in which the character became lined up horizontally with the row of cells. This assumes such a document speed as will ensure that this occurs once but only once for each character. Moreover the vertical scanning and dynamic storage procedure adopted means that vertical registration within the observed field is immaterial.

Because "or" logic is in practice necessary each character is likely to be recognised in each of a few (perhaps 3) consecutive scans and it may even be possible to make a spurious recognition of a meaningless combination of parts of adjacent characters. To avoid repeated recognition of the same character it may be arranged to inhibit recognition in the two or three scans following any recognition. Better, the recognised character can be stored and compared with the character recognised in the next two or three scans. If identity is preserved, the recognised character is accepted. If the character recognised changes say in the next two scans, reject can be signalled as one recognition signal at least is wrong.

If horizontal registration becomes difficult it may be found desirable to use the X and Y cells to check for completely white verticals and only to recognise when these cells indicate white verticals to either side of the character.

There are, of course, many modifications possible within the framework of the invention. It has already been indicated that the whole field can be scanned by a single cell, preferably using a flying spot scanner, and utilising storage before comparison to apply the local contrast criteria. Provided the scanning is along the rows as they are indicated in FIG. 2, storage in the ordinary sense could be dispensed with and the signals derived by scanning be fed into a tapped delay line, the taps along which would correspond to the cells X, A . . . Y, shown in FIG. 7 of the drawings.

Assuming a row of cells to be used it is by no means necessary to use the arrangement shown in FIG. 4 above the achieved scanning. One alternative is to use a single mirror attached to a vibration transducer instead of the mirror drum. A light, graticule and one or more photo cells operated in conjunction with the same mirror could provide the timing pulses.

A more important modification in which each character is scanned once only can be employed where higher speed than can be given by the main embodiment is required. The main embodiment uses a multiple scan procedure with relatively slow document movement, though it must be emphasised, also with greatly reduced registration problem. Registration problems in any single scan procedure are inherently more difficult.

The higher speed of operation can be achieved as indicated in FIG. 13(a) by a static row of cells indicated by line 100 and with rapid document motion along the line of characters. Alternatively, the document can be stationary, or have relatively slow motion perpendicular to lines of characters when several successive lines have to be read, and the row of cells 100 be scanned rapidly along the line.

The row of cells 100 in FIG. 13(a) has been drawn at the preferred angle of 45° to the vertical and horizontal and of sufficient length to accept a degree of vertical lack of registration. It is apparent that difficulty is likely to occur because of the row overlapping adjacent characters. The difficulty cannot be overcome satisfactorily by making the inclination of the row to the vertical less, as the detection of vertical limbs by the local contrast principle basic to the invention is upset. For this reason the row can be split up into a number of shorter rows one above the other as shown in FIG. 13(b). These variants require different arrangements of shift registers and logic though basically all will have the same underlying principle as already discussed in connection with the main embodiment.

Because of vertical registration difficulties a preliminary registering scan may be employed or the shift registers for limb detection be arranged as indicated schematically in FIG. 14. Here the registers are represented at 101 with information entering at the left and shifting in the direction of arrow 102. Superimposed on this shift there may be a high speed recirculating shift in the vertical direction as indicated by connection 103 to enable registration to be dealt within the manner explained in the specification of application No. 154,656, now abandoned.

Another modification will now be considered. This utilises reduced storage in the limb detection registers as shown in FIG. 15 where registers 60 to 64 have 1 to 5 positions respectively. Moreover referring to FIG. 2 the cell row motion is now required to be from bottom to top and not from top to bottom. In addition character mtion is reversed so as to be from left to right. Verticals can only be detected when aligned with cell E. Right verticals are detected first and in this modification simplication results if all characters are required to have right verticals. In the same scan as right verticals are detected, so are all horizontals detected, these appearing as blacks in E, D, C, B and A in that succession.

In FIG. 15, then horizontals are detected by a gate 110 connected to position I of all registers 60 to 64 and are entered into register 70 as before, but through a gate 125 whose purpose is described later. There is only one vertical detector gate 111 connected to positions V of registers 64 but verticals are gated into registers 71 to 73 by gates 112, 113 and 114 in accordance whether their time of occurrence indicates that they are right, centre or vetrical. Initially the gate 112 is open and when a scan is reached in which a right vertical is detected it is entered in register 71. In the same scan one or more horizontals will be detected and entered into register 70. The fact that horizontal and right vertical limbs are present is recognized by a gate and staticisor 115 which applies a start signal to a 4-bit counter 116 which has until this point remainder in state 0000. After the application of the start signal the scan pulses from cell 21, somewhat delayed, are counted. A gate 117 recognises states 0000 and 0001 of counter 116, and during these states (scans 1 and 2) holds gate 112 open. A gate 118 recognises states 0010 to 0101 and during these states (scans 3 to 6) holds gate 113 open so that centre verticals are fed to register 72. Similarly gate 119 recognises states 0110 to 1001 and opens gate 114 during scans 7 to 10 for left verticals to be entered into register 73. It will be appreciated that this arrangement gives some latitude regarding the permissible spacings between right, centre and left vertical limbs, that is the system can accept characters of variable width.

Characters are recognised by gates 120 which also supply a signal to reset counter 116 to the state 0000 in readiness for the next recognition and reset.

The state 0000 of counter 116 is recognised by a further gate 126 one output of which, on inhibit line 121, inhibits gates 122 in the recirculating connections of registers 70 to 73. The registers are therefore empty until information again starts to enter registers 70 and 71, so recommencing the cycle of operations described. Another output from gate 126 is used to open the "and" gate 125 already mentioned. Once the counter moves to 0001, gate 126 ceases to furnish a signal and gate 125 closes so that nothing further is entered into register 70 (which might otherwise assemble entries from successive scans to produce meaningless or misleading results) and whatever is entered into each register is retained on account of the opening of the recirculating gates 122.

No details are shown for gates 120 because the principle of their design has already been described with reference to gate 75 in FIG. 10. Neither does FIG. 15 show such conventional features as "or" gates for combining the inputs to the registers 70 to 73, and so on.

It has already been mentioned that an area may be adjudicated black if either of two halves of the area has a density greater than that of a function of densities of other areas in the immediate locality. An advantage of this is illustrated in FIG. 16 which shows how a skewed stroke may be detected. In FIG. 16 the cell row is not oblique, as in FIG. 2. Rather the row of apertures X1, X2, A1, A2 and so on is horizontal and each pair of apertures X1, X2; A1, A2 and so on makes up one area (as used in the claims). In effect, the area A is treated as black if either A1 or A2 is black and A1 and A2 can be adjudicated black quite separately for example, A1 being black if denser than the mean of X1 and B1 and A2 being black if denser than the mean of X2 and B2.

These criteria can readily be applied by the circuit indicated in FIG. 17 (for the A and B areas only) in which each of the comparators 30 in FIG. 7 is replaced by two comparators. The A1 comparator 131 for example receives inputs X1, A1 and B1, may be constructed as in FIG. 8 and produces an output indicating that A1 is black. Similarly the A2 comparator 132 produces an output indicating that A2 is black and the two outputs are combined in an "or" gate 133 so that, if either A1 or A2 is black, gate 133 produces an output applied to the A gate 57 in FIG. 9. In this figure the arrangement of registers 60 to 64 and gates 66 to 69 would obviously be altered to give the revised logic appropriate to the fact that the cell row is now horizontal.

The arrangement described will clearly detect the skewed limb 130 shown in FIG. 16 as a vetrical limb since, for the upper part of the limb is sensed as black by A1 and the lower part as black by A2 so that the A output is black for the whole length of the limb.

Another possibility illustrated in FIG. 16 is the use of overlapping, diamond shaped apertures. A thin limb 134 exactly midway between C1 and D1 may not be detected by either cell. The limb will however be most certainly detected by C2. The apertures need not be diamond shaped. Overlapping circles could be used for example.

It might be mentioned here that the requisite shaped apertures can be made using bundles of glass fibres to "pipe" the light to the photo-cell or photo-multiplier. The ends of the bundles on to which the image of the character is projected are given the required cross section, bonding the fibres with a resin to set them in this configuration. In this way apertures of the order of 1 mm. across can be made. It will be understood that previous references to the "cell row" really apply to the aperture row. As the light is "piped" to the cells, they can be arranged in any convenient positions.

FIG. 18 shows a further possibility of using three rows of apertures in place of one as in FIG. 2. Above the row X, A, B . . . Y is a row 1 to 7 and below is a row 8 to 14. It is still only the apertures A to E which are adjudicated black or white but each is now compared with all *eight* surrounding apertures in the way illustrated for the aperture C only in FIG. 19. The outputs of the cells corresponding to the eight apertures 3, 4, 5, B, D, 10, 11 and 12 are applied in pairs to four summing amplifiers 135 producing outputs representing the mean density of the pair 3 and 12, the pair 4 and 11, the pair B and D and the pair 5 and 10. These are the four pairs of apertures straddling the aperture C. The four outputs are actually negative as shown in FIG. 19. Each output is applied to an individual summing amplifier 137 receiving the signal from C as its other input. An amplifier 137 will only produce an output if there is sufficient contrast between C and the pair of apertures providing the other input to the amplifiers. The outputs of amplifiers 137 are combined in an "or" gate 136 and provided the output of the "or" gate exceeds a certain value, C is adjudicated black. Otherwise it is white. Mathematically C is black if $C - \frac{1}{2}(3+12)$ or $C - \frac{1}{2}(4+11)$ or $C - \frac{1}{2}(B+D)$ or $C - \frac{1}{2}(5+10)$ is greater than the said certain value.

There are 5 "or" gates 136 corresponding to the apertures A and E and the outputs of the 5 amplifiers are treated as already described to detect limbs, from which characters are detected. This arrangement will detect horizontal, vertical and diagonal limbs and combinations of these. No matter what junction of limbs is present say in aperture C1 in FIG. 19, at least one of the pairs of straddling apertures will be white and lead to adjudication of C as black.

There may be one photo-cell per aperture shown in FIG. 18. Alternatively one cell only per column can be used and the additional apertures be simulated by delay lines as shown, for the column 4–C–11 only, in FIG. 20. Aperture 4 exists physically and has a photo-cell 138 providing the aperture 4 output direct. The same output, delayed by delay line 139 provides the aperture C output, and further delayed by delay line 140 provides the aperture 11 output. The delay time of each line 39, 40 corresponds to the time taken to scan the distance $d$ shown in FIG. 18.

The features described on the one hand in conjunction with FIGS. 16 and 17 and on the other hand in conjunction with FIGS. 18 to 20 can clearly be combined. There are obviously very many further possibilities, all lying within the scope of the broad principles of this invention as described and claimed. One final possibility which may be mentioned is the use of sequence detectors instead of shift registers. This is suggested by the poor use that is made of all the storage space in the registers. Sequence detectors use little storage space but may incorporate built in logic.

It will be appreciated that the logic can readily be modified to enable limb junctions to be detected as well as, or instead of, limbs.

We claim:

1. In character recognition apparatus of the kind comprising means for sensing the parts of characters to derive a plurality of electrical signals, each of which correspond to the luminance value of a matrix of cells defining an intelligence-bearing item space, and logical circuit means responsive to such signals to identify the characters, the improvement comprising the combination of:

means for scanning a document bearing a character to derive an analogue signal representing image density in respect of each of said matrix of cells, comparator means having first and second inputs, means for supplying the analogue signal from one cell to one input, weighted means for supplying to the other input a combined analogue signal only from at least two of the cells in the near proximity of the said one cell and for weighting this combined signal in accordance with the greater area of the plurality of cells compared with the one cell, said comparator means being responsive to the relative magnitudes of the signals on its first and second inputs to supply the electrical output signal for the said one cell.

2. In character recognition apparatus of the kind comprising means for sensing the parts of characters to derive a plurality of two-level electrical signal, each of which correspond to the luminance value of a matrix of cells defining an intelligence-bearing item space, and logical circuit means responsive to such signals to identify the characters, the improvement comprising the combination of:

a row of electro-optical scanning means and means for producing effective relative movement between a document bearing a character and the said row of scanning means in a direction transverse to said row, a plurality of comparator means each having first and second inputs and adapted to produce one of said two-level output signals, depending upon which input has the greater signal applied thereto, each comparator means comprising means for applying the analogue output of one scanning means to the first comparator input and weighting resistors for applying only the outputs of at least two of those scanning means approximately adjacent and surrounding the said one scanning means to the second comparator input, said logical circuit means being connected to the outputs of the comparator means.

3. The invention according to claim 2, comprising the further improvement of means for combining and integrating the outputs of all the scanning means, the output of the combining and integrating means being applied to the second input of each comparator means.

4. In character recognition apparatus of the kind comprising means for sensing the parts of characters to derive a plurality of two-level electrical signals, each of which correspond to the luminance value of a matrix of cells defining an intelligence-bearing item space, and logical circuit means responsive to such signals to identify the characters, the improvement comprising the combination of:

first, second and third parallel rows of electro-optical scanning means and means for producing effective relative movement between a document bearing a character and the said rows in a direction transverse to the rows, the second row of scanning means lying between the first and third rows, a plurality of comparator means each having first and second inputs and adapted to produce one of said two-level output signals depending upon which input has the greater signal applied thereto, each comparator means comprising means for applying the analog output of one scanning means in the second row to the first comparator input and weighting resistors for applying only the outputs of at least three of those scanning means approximately adjacent and surrounding the said one scanning means in all three of the rows and surrounding the said one means to the second comparator input, said logical circuit means being connected to the outputs of the comparator means.

5. In character recognition apparatus of the kind comprising means for sensing the parts of characters to derive a plurality of two-level electrical signals, each of which correspond to the luminance value of a matrix of cells defining an intelligence-bearing item space, and logical circuit means responsive to such signals to identify the characters, the improvement comprising the combination of:

means for sensing a document bearing a character to derive a first analog signal representing image density in respect of each of the matrix of cells, means for deriving a second analog signal representing image density in respect of each of a plurality of regions approximately surrounding the cells respectively, comparator means having first and second inputs, means for supplying only the first and second analog signals to the inputs respectively, said comparator means being responsive to the relative magnitude of the signals on its first and second inputs to supply the electrical output signal for a cell whereby determining the luminance value of said cell.

6. In character recognition apparatus of the kind comprising means for sensing the parts of characters to derive a plurality of two-level electrical signals, each of which correspond to the value (lightness or darkness) of a plurality of adjacent areas defining an intelligence-bearing item space, and logical circuit means responsive to such signals to identify the characters, the improvement comprising the combination of: means for scanning a document bearing a character to derive an analogue signal representing image density in respect of each of said plurality of adjacent areas; comparison means for weighing within said plurality of adjacent areas the analogue signal of a selected area to only an analogue signal of any number of other areas approximately adjacent to said selected area; said comparison means being responsive to the relative magnitude of the signal applied thereto on the basis of local contrast to supply the two-level output signal for said selected area.

7. In character recognition apparatus of the kind including means for sensing the parts of characters to derive a plurality of two-level electrical signals and having logical circuit means responsive to said signals for identifying said characters, the improvement comprising the combination of:

a plurality of electro-optical scanning means aligned in a row for producing an electrical analog of a character, and means for producing effective relative movement between a document bearing a character and the said row of scanning means in a direction transverse to said row;

a plurality of pairs of serially connected first and second delay means, one each of said pairs being connected to the output of one each of said scanning means for delaying the output signal from said scanning means;

a plurality of comparator means, each of said comparator means having first and second inputs and adapted to produce a two-level output signal depending upon which input has the greater signal applied thereto;

each of said comparator means including means for applying the output of a first delay means of one of said pairs of delay means to said first input, and a plurality of weighting resistors connecting the output of said second delay means of said pair and for connecting the outputs of some of the scanning means located adjacent to and on either side of the scanning means connected to said pair of delay means to the second input of said comparator means;

said logical circuit means being connected to the outputs of the comparator means.

8. Apparatus for determining the luminance value of at least some of the cells of a two dimensional matrix of cells which define an intelligence-bearing item space by pre-processing analogue electrical signals produced from means for sensing the shape of an intelligence bearing item within said space, said shape sensing means including a two dimensional matrix of transducer means disposed adjacent said some cells where each of said transducer means produces one of said analog electrical signals, said apparatus comprising:

means for comparing only first and second analogue electrical signals;

means responsive to one of said transducer means for generating said first analogue electrical signal and;

means responsive to at least two of the transducer means in the near proximity of said one transducer means for generating said second analogue electrical signal;

whereby the output of said comparing means is indicative of the relative magnitude of said first analogue signal with respect to said second analogue signal and thereby determining the luminance value of the cell corresponding to said first analogue signal.

9. Apparatus as in claim 8 where said means for generating the second analogue electrical signal is responsive to all of the transducer means surrounding said one transducer means.

10. Apparatus as in claim 8 where said second analogue electrical signal is a mathematical function of the output signals from said two transducer means.

11. Apparatus as in claim 10 where said second analogue electrical signal is the average of the output signals from said two transducer means.

12. Apparatus as in claim 10 where said means for generating said second analogue electrical signal includes means for weighting the outputs from said two transducer means and adding said two weighted outputs.

13. Apparatus as in claim 8 where said two transducer means are respectively disposed to the right and left of said one transducer means.

14. Apparatus as in claim 8 where said two transducer means are respectively disposed to the top and bottom of said one transducer means.

15. Apparatus as in claim 8 where said two transducer means are respectively disposed at opposite diagonal positions with respect to said one transducer means.

16. Apparatus as in claim 8 including a plurality of said comparing means respectively associated with at least some of said transducer means.

17. Apparatus as in claim 8 where said comparing means includes a differential amplifier.

18. Apparatus as in claim 8 where said comparing means includes a differential amplifier.

References Cited

UNITED STATES PATENTS

| | | | |
|---|---|---|---|
| 3,106,699 | 10/1963 | Kamentsky | 340—172.5 |
| 3,187,304 | 6/1965 | Taylor | 340—146.3 |
| 3,292,148 | 12/1966 | Giuliano et al. | 340—146.3 |
| 3,201,752 | 8/1965 | Rabinow | 340—146.3 |
| 3,202,965 | 8/1965 | Nadler | 340—146.3 |
| 3,196,392 | 7/1965 | Horwitz | 340—146.3 |
| 3,222,638 | 12/1965 | Shelton | 340—146.3 |

OTHER REFERENCES

Kamentsky, L. A.: Proceeding of the Western Joint Computer Conference, 1959, pp. 304–309.

Grimsdale, R. L.: Proceedings of I.E.E., Paper No. 2792M, December 1958, pp. 210–221.

Bomba, J. S.: Proceedings of Eastern Joint Computer Conference, 1959, pp. 218–224.

Unger, S. H.: Proceedings of IRE, October 1959, pp. 1737–1751.

MAYNARD R. WILBUR, Primary Examiner

L. BOUDREAU, Assistant Examiner